(12) United States Patent
Du

(10) Patent No.: US 8,861,484 B2
(45) Date of Patent: Oct. 14, 2014

(54) METHOD FOR TRANSMITTING AND RECEIVING SYSTEM INFORMATION

(75) Inventor: Zhongda Du, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 493 days.

(21) Appl. No.: 12/883,500

(22) Filed: Sep. 16, 2010

(65) Prior Publication Data

US 2011/0002258 A1  Jan. 6, 2011

Related U.S. Application Data

(63) Continuation of application No. PCT/CN2008/073710, filed on Dec. 24, 2008.

(30) Foreign Application Priority Data

Mar. 25, 2008 (CN) .......................... 2008 1 0087698

(51) Int. Cl.
  *H04J 3/00*  (2006.01)
  *H04B 7/26*  (2006.01)
  *H04W 48/08*  (2009.01)

(52) U.S. Cl.
  CPC ............. *H04B 7/2656* (2013.01); *H04W 48/08* (2013.01)
  USPC ........................................................ 370/336

(58) Field of Classification Search
  None
  See application file for complete search history.

(56) References Cited

U.S. PATENT DOCUMENTS

| 2009/0262693 A1* | 10/2009 | Wang et al. .................... 370/329 |
| 2010/0183031 A1* | 7/2010 | Dalsgaard et al. ............. 370/474 |
| 2010/0297991 A1* | 11/2010 | Dahlman et al. ............ 455/422.1 |

FOREIGN PATENT DOCUMENTS

| CN | 1567769 A | 4/2005 | ............... H04J 13/00 |
| EP | 2262339 A1 | 12/2010 | ............ H04W 72/12 |
| WO | WO 2007/024110 A1 | 3/2007 | ................ H04B 7/26 |

OTHER PUBLICATIONS

"Transmission of Dynamic System Information," Ericsson, 3GPP TSG-RAN2 Adhoc Meeting, R2-075559, Dec. 14, 2007.*
"Discussion of System INformation Scheduling," Huawei, 3GPP TSG RAN WG2 Meeting #60bis, R2-080223, Jan. 18, 2008.*
Huawei: "Discussion of System Information Scheduling", 3GPP TSG RAN WG2 Meeting #60bis, XP002667261, 3 pages, Jan. 14, 2008.

* cited by examiner

*Primary Examiner* — Chirag Shah
*Assistant Examiner* — Jenkey Van

(57) ABSTRACT

A method for transmitting and receiving system information, wherein the method for transmitting the system information includes that a sub-frame used to transmit other system information and a sub-frame used to transmit system information 1 are arranged in different time domain. With the present invention, the influence caused by the re-transmission of the system information 1 on the other system information can be reduced.

5 Claims, 5 Drawing Sheets

METHOD FOR TRANSMITTING AND RECEIVING SYSTEM INFORMATION

This is a continuation of International Application PCT/CN2008/073710, with an International Filing Date of Dec. 24, 2008, which claims priority to Chinese Application No. 200810087698.X, filed Mar. 25, 2008, each of which is incorporated by reference.

FIELD OF THE INVENTION

The present invention relates to Long-Term Evolution (LTE for short) system, in particular to a method for transmitting and receiving system information of a mobile cellular network.

BACKGROUND OF THE INVENTION

In the LTE system, the system information can be classified into main system information (MIB) and general system information (SI). Wherein, the MIB is transmitted on the broadcast channel with a fixed transmission period of 40 ms, i.e., the first transmission of the MIB in a period happens always when SFN (System Frame Number) MOD 4=0 (i.e., SFN %4=0). The SI is transmitted on the downlink shared channel, wherein system information 1 (SI-1) is transmitted with a fixed transmission period of 80 ms, i.e., the first transmission of the SI-1 in a period happens always when SFN MOD 8=0. The scheduling information of the other SIs is included in the SI-1, comprising parameters such as scheduling period and transmission window. A terminal can deduce the time or time range of the transmission of the SI from such scheduling information. The transmission of the system information employs a dedicated Hybrid Automatic Repeat Request (HARQ for short), and employs a dedicated Radio Network Temporary Identifier (RNTI for short) on the Dedicated Physical Control Channel (DPCCH for short) to distinguish it from other downlink signaling or data.

In view of a terminal, the receiving process of the system information is as follows: after the process of cell searching, the terminal first receives an MIB, receives the content of the SI-1 according to the scheduling features of the SI-1, deduces the scheduling rule of the other SIs from the SI-1, and then performs the receiving in a specified time. When receiving the SI, the terminal obtains the description information, such as frequency resource and Modulation and Coding Scheme (MCS for short), of the wireless resource carrying the SI from the DPCCH corresponding to the SI, i.e., the resource scheduling of the SI is dynamic.

Related system parameters are often incorporated into one System Information Block (SIB for short), for example, the parameters related to the cell reselection will be organized in the same SIB, and one or more SIBs can be included in one SI. Obviously, the scheduling periods of these SIBs are the same, but the SIBs with the same scheduling period are not always contained in one SI, i.e., it is allowed that different SIs have the same scheduling period, for instance, the SIs of neighboring cells, wherein the neighboring cells can be classified into in-frequency neighboring cells, inter-frequency neighboring cells, GSM/EDGE Radio Access Network (GERAN) neighboring cells, UMTS Terrestrial Radio Access Network (UTRAN) neighboring cells, and Code Division Multiple Access (CDMA) 2000 neighboring cells, etc.

In order to improve the coverage range of the system information, the MIB and the SI will be both retransmitted in one scheduling period. For example, the MIB will be retransmitted for 4 times in the period of 40 ms. In general, the SI can be retransmitted in two manners, i.e., continuous retransmission manner and discrete retransmission manner. The continuous retransmission manner means that the retransmission of the SI is completed in one relatively short time window, and the terminal shall continuously receive the retransmitted content in this time window. The discrete retransmission manner means that there is a certain time interval between the retransmitted content, and the terminal does not need to continuously receive between two retransmissions. The greatest benefit of the discrete retransmission lies in that the receiving time diversity for the terminal is increased.

The network constantly retransmits the MIBs and the SIs according to the scheduling rule, but it is not necessary for a certain terminal to always receive all the MIBs and the SIs, because the system information is periodically broadcasted content, and after a terminal has read out valid system information, the terminal can choose to skip the received SIs, unless the content of the system information has been changed or the terminal can not determine whether the valid system information has been stored. Another reason is that different terminals have different terminal capabilities. For some terminals, for example, for the terminals not supporting the CDMA2000, the SIs of a neighboring cell in the CDMA2000 are invalid to them, thus the terminals also can choose not to read out the SIs containing the CDMA2000 all the time. However, the premise for such kind of a terminal behavior is that the terminals should clearly know the starting time and the ending time of the transmission of a certain SI.

However, sometimes a terminal can not determine the starting time and the ending time of the transmission of an SI merely according to the scheduling period of the SI, because the scheduling periods of the SIs often have a relationship that one is simply a multiple times of another, and even some SIs have the same scheduling period. For instance, SI-1 has a scheduling period of 80 ms, SI-2 has a scheduling period of 160 ms, SI-3 and SI-4 have a scheduling period of 320 ms, then SI-1, SI-2, SI-3 and SI-4 will appear simultaneously at the radio frame with SFN MOD 8=0, such as SFN=320. It should be noted that SI-3 and SI-4 are always scheduled in an overlap way, and in this case the terminal can not determine the starting time and the ending time for SI-3 and SI-4, thus the terminal can not selectively receive the system information with accuracy.

During the current process of the transmission of the system information, it is not allowed to have an overlap phenomenon of the retransmission between the SI-1 and other system information. Since the scheduling period of the SI-1 is fixed, i.e., 80 ms, the space left for other SIs will be very small if the SI-1 needs to be retransmitted for many times in the period. For instance, if the SI-1 needs to be retransmitted for 4 times, the SI-1 will occupy 4 radio frames because in each radio frame SI-1 can only be transmitted once, thus there are only 4 radio frames left for other system information, i.e., 40 ms. Obviously, the retransmission of the SI-1 will affect the scheduling for other system information, therefore a technology for solving this problem is desired.

SUMMARY OF THE INVENTION

The present invention is provided in consideration of the problem in the related art that a technology for reducing the influence of the SI-1 retransmission on the scheduling of other SIs is desired. To this end, the object of the present invention is to provide a method for transmitting and receiving system information.

To achieve the above purpose, according to one aspect of the present invention, the present invention provides a method for transmitting system information, SI, used for transmitting general SI by a base station, wherein the general SI comprises an SI-1 and an other SI.

The method for transmitting the SI according to the present invention comprises the following processes:

setting a sub-frame for transmitting the other SI and a sub-frame for transmitting the SI-1 in different time domains.

Additionally, in the case that a transmission window of the SI-1 overlaps with a transmission window of the other SI, the SI-1 and the other SI are transmitted in the transmission window of the SI-1;

Preferably, for the other SI, further comprising: according to a predetermined relationship, determining a plurality of predetermined radio frames and one or more the other SIs corresponding to each of the predetermined radio frames, wherein the predetermined relationship is that the result of the system frame number of the predetermined radio frame MOD the scheduling period of the one or more the other SIs corresponding thereto is 0; according to the sequence of the scheduling information of the other SI configured in the SI-1, starting to transmit the determined one or more the other SIs from the predetermined radio frames.

Additionally, in the case that an overlap of the transmission windows occurs, the other SI with a prior transmission sequence is transmitted at first.

Preferably, in the case that the other SI employs a continuous retransmission manner, the other SIs, which are identical with each other, are transmitted only once in the transmission window.

Preferably, for an other SI to be transmitted after the other SI transmitted with delay, it is transmitted after the transmission of the other SI transmitted with delay.

To achieve the above purpose, according to another aspect of the present invention, the present invention provides another method for transmitting system information, SI, wherein the general SI comprises an SI-1 and an other SI.

The method for transmitting the SI according to the present invention comprises the following processes: according to a predetermined relationship, determining a plurality of predetermined radio frames and one or more the other SIs corresponding to each of the predetermined radio frames, wherein the predetermined relationship is that the result of the system frame number of the predetermined radio frame MOD the scheduling period of the one or more the other SIs corresponding thereto is 0; according to the sequence of the scheduling information of the other SI configured in the SI-1, starting to transmit the determined one or more the other SIs from the predetermined radio frames; a sub-frame used for transmitting one or more the other SIs is different from a sub-frame used for transmitting the SI-1 in the time domain.

Wherein, in the case that the transmission windows overlap, the other SI with a prior transmission sequence is transmitted at first.

Wherein, in the case that the transmission window of the SI-1 overlaps with the transmission window of the other SI, the SI-1 and the other SI are transmitted in the transmission window of the SI-1.

Preferably, in the case that the SI employs a continuous retransmission manner, the other SIs, which are identical with each other, are transmitted only once in the transmission window.

To achieve the above purpose, according to a further aspect of the present invention, the present invention provides a method for receiving system information, SI, used for a terminal to receive general SI transmitted on the downlink by a base station, wherein the general SI comprises an SI-1 and an other SI.

The method for receiving system information according to the present invention comprises: a sub-frame used for receiving the other SI by the terminal is different from a sub-frame used for receiving the SI-1 by the terminal in the time domain.

Preferably, for the other SI other than the SI-1, further comprising: according to a predetermined relationship, determining a plurality of predetermined radio frames and one or more the other SIs corresponding to each of the predetermined radio frames, wherein the predetermined relationship is that the result of the system frame number of the predetermined radio frame MOD the scheduling period of the one or more the other SIs corresponding thereto is 0; according to the sequence of the scheduling information of the other SI configured in the SI-1, starting to receive the determined one or more the other SIs from the predetermined radio frames.

Preferably, in the case that an overlap of windows occurs, the other SI with a prior transmission sequence is received at first.

Preferably, in the case that the SI employs a continuous retransmission manner, further comprising: the other SIs, which are identical with each other, are received only once in the receiving window.

With at least one of the above technical schemes provided by the present invention, by allowing the transmission window of the SI-1 overlapping with those of the other SIs, or by allowing the receiving window of the SI-1 overlapping with those of the other SIs, the problem that the SI-1 retransmission affects the scheduling of other SIs is solved, thus the influence of the SI-1 re-transmitting on the scheduling of other SIs is alleviated.

Other features and advantages of the present invention will be illustrated in the following description and partly apparent thereof, or can be understood by implementing the present invention. The object and other advantages will be realized and obtained through the structure specified in the specification, claims and drawings.

BRIEF DESCRIPTION OF THE DRAWINGS

Drawings are provided for the further understanding of the present invention and form a part of the specification, which are used to explain the present invention with the embodiments of the present invention rather than limit the present invention, wherein.

DETAILED DESCRIPTION OF THE EMBODIMENTS

Functionality Summary

As described above, in the current method for transmitting system information, the re-transmissions of an SI-1 and an other SI are not allowed to be overlapped, thus the re-transmission of an SI-1 occupies overmuch so that the transmission of the other SI may be affected. To this end, the present invention provides a method for transmitting system information and a method for receiving the information. In the technical scheme of the present invention, the sub-frame for transmitting the other SI and the sub-frame for transmitting the SI-1 are set in different time domains.

In the following description, the following relationship exists with respect to system information SI-1 to SI-6.

SIB1 (whose content is the information relating to Cell Access information) is mapped to SI-1; SIB2 (whose content is the information relating to Common and shared channel information) is mapped to SI-2; SIB3 (whose content is the information relating to Cell Reselection information) is mapped to SI-3; SIB4 (whose content is the information relating to LTE intra-frequency neighboring cell) is mapped to SI-4; SIB5 (whose content is the information relating to LTE inter-frequency neighboring cell) is mapped to SI-5; SIB6 (whose content is the information relating to UTRAN neighboring cell) is mapped to SI-6.

The present invention will be described in connection with drawings. It should be understood that the preferred embodiments set forth herein are only used to explain and illustrate rather than to limit the present invention.

In the following description, a plurality of specific details is described for the purpose of explanation, so as to provide a thorough understanding to the present invention. However, it is obvious that the present invention can be realized without these specific details. Additionally, the following embodiments and various details thereof can be combined in various ways without departing from the spirit and scope defined in the attached claims.

Method Embodiment 1

Figure 1:
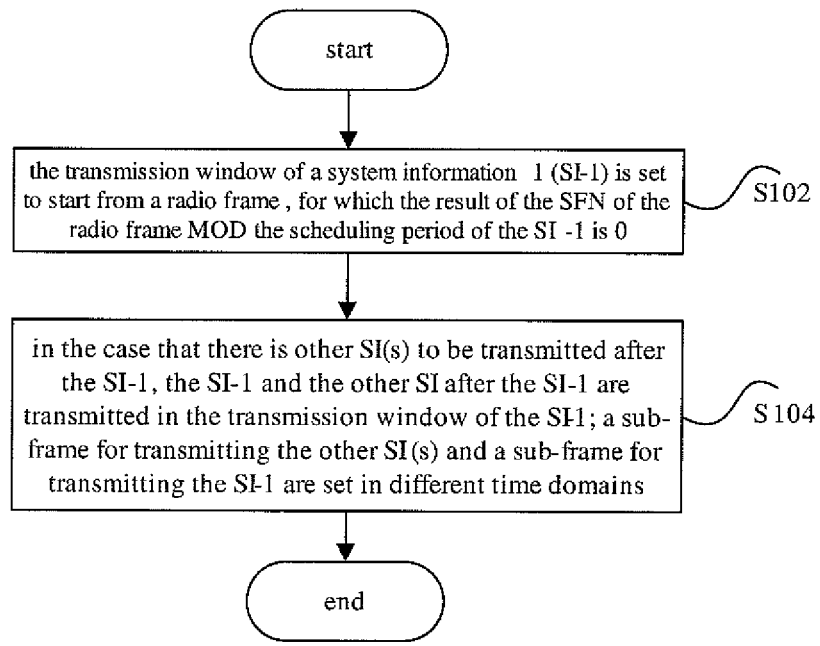
FIG. 1 is a flow chart of the method for transmitting system information according to Embodiment 1 of the present invention.

According to the embodiment of the present invention, a method for transmitting system information is first provided. FIG. 1 is a flow chart of the method for transmitting system information according to the embodiment of the present invention. As shown in FIG. 1, the method comprises the following processes (Step S102-Step S104):

Step S102, the transmission window of a system information 1 (SI-1) is set to start from a radio frame, for which the result of the SFN of the radio frame MOD the scheduling period of the SI-1 is 0;

Step S104, in the case that there is other SI(s) to be transmitted after the SI-1, the SI-1 and the other SI(s) after the SI-1 are transmitted in the transmission window of the SI-1; in the present embodiment, the sub-frame for transmitting the other SI(s) and the sub-frame for transmitting the SI-1 are set in different time domains, i.e., the sub-frame for transmitting the other SI(s) is different from the sub-frame for transmitting the SI-1 in the time domain.

In the present embodiment, 1) if the transmission window of the SI-1 overlaps with the transmission window(s) of the other SI(s), the SI-1 and the other SI(s) will be transmitted in the transmission window of the SI-1; 2) if an overlap of transmission windows occurs, the other SI(s) with a prior transmission sequence is transmitted at first; 3) in the case that the other SI(s) employs a continuous retransmission manner, the other SIs, which are identical with each other, are transmitted only once in the transmission window; 4) the other SI(s), which are to be transmitted after the other SI(s) transmitted with delay, are transmitted after the transmission of the other SI(s) transmitted with delay.

It can be easily understood that, if the scheduling period of the SI-1 is 80 ms, then the transmission of the SI-1 will be started from the radio frame with SFN %8=0, in particular, in 640 ms, these radio frames are the radio frames with SFN=0, SFN=8, SFN=16, SFN=32, SFN=40, SFN=48, SFN=56.

EXAMPLE 1

Figure 2:
FIG. 2 is a schematic view of Example 1 of the method for transmitting system information according to Embodiment 1 of the present invention.
Figure 2:
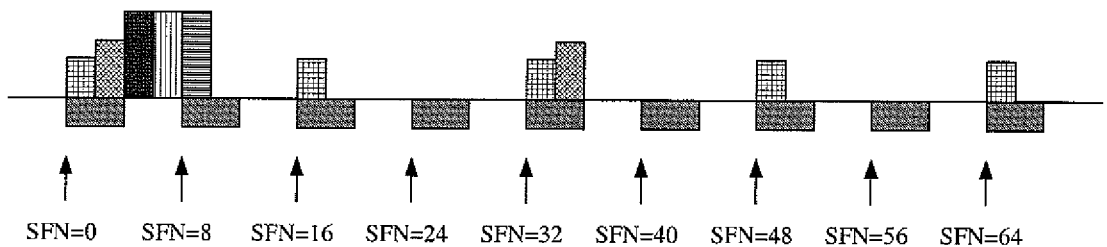

The above process can be better understood through the example shown in FIG. 2. In the example shown in FIG. 2, the scheduling period of SI-2 is 160 ms, the scheduling period of SI-3 is 320 ms, and the scheduling period of SI-4, SI-5, and SI-6 are 640 ms.

It is assumed that, the system frame starts from 0, SI-1 repeats 8 times, SI-2 repeats 4 times, SI-3 repeats 2 times, and other SIs repeat one time in 640 ms. It is assumed that the transmission window of SI-1 is 40 ms, and the transmission windows of the other SIs are 20 ms, and the transmission sequence of various SIs is SI-1, SI-2, SI-3, SI-4, SI-S, SI-6. As shown in FIG. 2, at the place where SFN=0, the transmission sequence of the SIs is SI-1, SI-2, SI-3, SI-4, SI-5, SI-6; wherein SI-1 and SI-2 have the same starting point, i.e., SI-1 and the SI-2 thereafter are transmitted at the same time, at the position where SFN=16, SI-1 and SI-2 are transmitted at the same time.

In addition, in the case that the transmission window of the SI-1 overlaps with the transmission window(s) of the other SI(s), the SI-1 and the other SI(s) are transmitted in the transmission window of the SI-1, i.e., in the present invention, it is allowed that the transmission window of the SI-1 and the transmission window(s) of the other SI(s) overlaps. For example, for SFN=8 in FIG. 2, not only SI-1 but also SI-6 are needed to be transmitted, through the present invention, SI-6 and SI-1 are transmitted at the same time.

It can be seen that one or more SIs or a portion of an SI can be transmitted simultaneously in the transmission window of the SI-1. Thus, the influence of the re-transmission of the SI-1 on the other SIs can be reduced.

On the other hand, in the currently used method for transmitting the SI, with respect to the MIB (main system information) and the SI (general system information) continuously transmitted by the network according to a scheduling rule, a terminal can selectively receive them, but the premise for such an operation of the terminal is that the terminal should clearly know the starting time and the ending time of the transmission of a certain SI. Obviously, in some cases (for example, system information overlaps), the premise can not be achieved only based on the scheduling information of the SI.

Figure 3:
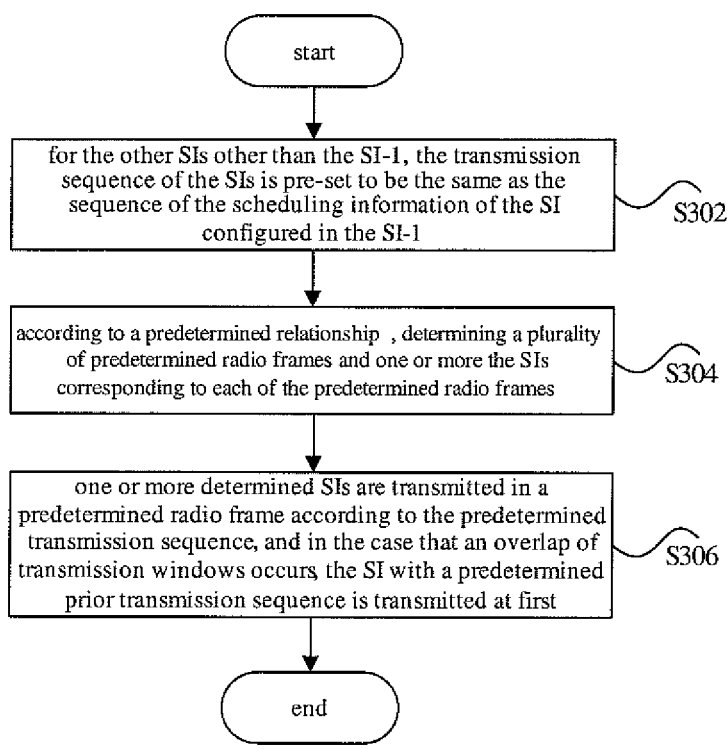
FIG. 3 is a flow chart of part of the process of the method for transmitting system information according to an embodiment of the present invention.

To this end, in the method for transmitting the SI according to the embodiment of the present invention, the following processes as shown in FIG. 3 will be further performed, Step S302, for the other SIs other than the SI-1, the transmission sequence of the SIs is pre-set to be the same as the sequence of the scheduling information of the SI configured in the SI-1;

Step S304, according to a predetermined relationship, determining a plurality of predetermined radio frames and one or more the SIs corresponding to each of the predetermined radio frames, wherein the predetermined relationship is that the result of the system frame number of the predetermined radio frame MOD the scheduling period of one or more SIs corresponding thereto is 0;

Step S306, one or more determined SIs are transmitted in a predetermined radio frame according to the predetermined transmission sequence, and in the case that an overlap of transmission windows occurs, the SI with a predetermined prior transmission sequence is transmitted at first.

Further referring to FIG. 2, the sequence of the scheduling information configured in the SI-1 is SI-2, SI-3, SI-4, SI-5, SI-6, thus, according to the present invention, the transmission sequence for the SI is SI-2, SI-3, SI-4, SI-5, SI-6 (corresponding to above step S302).

In 640 ms, for the radio frame with SFN=0, SFN %8=0, SFN %16=0, SFN %32=0, SFN %64=0, and thus SI-2, SI-3, SI-4, SI-5 and SI-6 are also transmitted in the radio frame with SFN=0 besides SI-1 and the transmission sequence is SI-1, SI-2, SI-3, SI-4, SI-5, SI-6.

According to the above method, it can also be determined that, for the radio frame with SFN=8, SFN % S=0, and thus the SI transmitted from the radio frame with SFN=8 only includes SI-1; for the radio frame with SFN=16, SFN %8=0, SFN %16=0, and thus the SI transmitted from the radio frame with SFN=16 includes SI-2 besides SI-1. Similarly, for the physical frame with SFN=24, SFN %8=0, and thus the SI transmitted at the radio frame with SFN=24 only includes SI-1; for the physical frame with SFN=32, SFN %8=0, SFN %16=0, SFN %32=0, and thus the SI transmitted at the radio frame with SFN=32 includes SI-2 and SI-3 besides SI-1; for the physical frame with SFN=40, SFN %8=0, and thus the SI transmitted at the radio frame with SFN=40 only includes SI-1; for the radio frame with SFN=48, SFN %8=0, SFN %16=0, and thus the SI transmitted at the radio frame with SFN=48 includes SI-2 besides SI-1; for the radio frame with SFN=56, SFN %8=0, and thus the SI transmitted at the radio frame with SFN=56 only includes SI-1. (The above process corresponds to step S304)

Based on the above configuration, SI-1, SI-2, SI-3, SI-4, SI-5, SI-6 are transmitted in the physical frame with SFN=0, SI-1 and SI-6 are transmitted in the physical frame with SFN=8, and the transmission windows of the two SIs overlap; in the physical frame with SFN=16, SI-1 and SI-2 are transmitted at the same time. The transmission situation of other radio frames can also be understood by referring to FIG. 2. (The above process corresponds to Step S306)

In FIG. 2, each SI employs a continuous re-transmission manner, as can be seen from FIG. 2, the final scheduling rule of the above SIs is as follows:

SI-1: SFN % S=0
SI-2: SFN %16=0
SI-3: SFN %32=2
SI-4: SFN %64=4
SI-5: SFN %64=6
SI-6: SFN %64=8.

EXAMPLE 2

Figure 4:
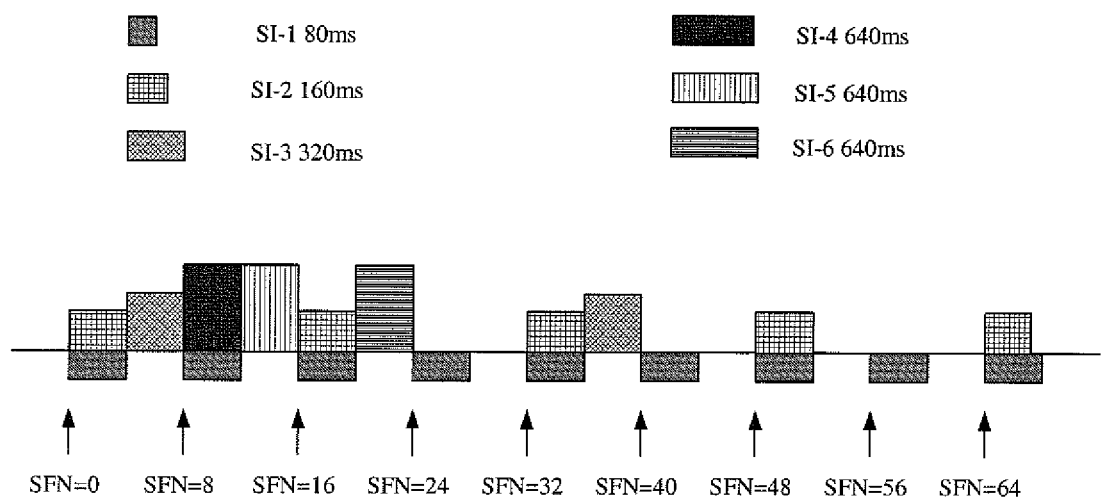
FIG. 4 is a schematic view of Example 2 of the method for transmitting system information according to Embodiment 1 of the present invention.

In the example as shown in FIG. 4, it is assumed that the transmission windows of the SI-1 and the other SIs are 40 ms, the sequence of the scheduling information configured in the SI is SI-2, SI-3, SI-4, SI-5, SI-6. The processes in Step S302 and S304 are similar to those shown in FIG. 2, and thus the description is omitted.

As shown in FIG. 4, at the place where SFN=0, the transmission sequence of the SIs is SI-2, SI-3, SI-4, SI-5, SI-6, wherein SI-1 and SI-2 have the same starting point. (Corresponding to the process of above step S104.)

At the place where SFN=8, the transmission windows of SI-4 and SI-1 overlap, and thus, as shown in FIG. 4, both SI-4 and SI-1 are transmitted in the transmission window of SI-1 according to the technical scheme of the embodiment of the present invention.

At the place where SFN=16, the transmission sequence of the SIs is SI-1, SI-2, and SI-1 and SI-2 are transmitted simultaneously. It would start to broadcast SI-6 at the time where SFN=16, however, since the scheduling rule of the SI-1 determines that it starts to broadcast SI-2 also at the time where SFN=16, the broadcast of SI-6 is delayed to be after SI-2.

In other places where SFN %8=0, the SIs are broadcasted one-by-one sequentially according to the method of the present invention, for instance, at the place where SFN=32, the sequence for broadcasting the SIs is SI-1, SI-2, SI-3, wherein SI-1 and SI-2 have the same starting point.

In this example, each SI employs a continuous retransmission manner, the scheduling rule of each SI is as follows:

SI-1: SFN %8=0
SI-2: SFN %16=0
SI-3: SFN %32=4
SI-4: SFN %64=8
SI-5: SFN %64=12
SI-6: SFN %64=20.

It can be seen from the above description that by allowing the transmission window of the SI-1 to overlap with the transmission window(s) of other SI(s) and setting the transmission sequence of each SI, not only the influence on the other SI(s) caused by the re-transmission of the SI-1 can be reduced, but also the terminal is enabled to obtain the starting time and ending time of the transmission of each SI, and thus it can selectively perform receiving according to its demand.

Figure 5:
FIG. 5 is a schematic view of Example 3 of the method for transmitting system information according to Embodiment 1 of the present invention.
Figure 5:
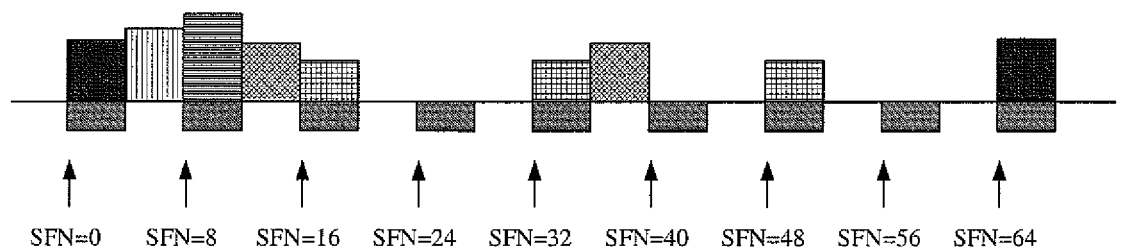

In addition, it should be illuminated that in the present invention, for the identical SIs whose transmission windows overlap, the identical Sis are transmitted only once in the transmission window. Hereinafter, it will be described in connection with the example as shown in FIG. 5.

EXAMPLE 3

In this embodiment, it is assumed that the transmission window is 40 ms, the scheduling periods of other SIs are the same as those of Example 1 and Example 2. In addition, the transmission sequence in this embodiment is SI-1, SI-4, SI-5, SI-6, SI-3, SI-2.

The SI transmitted in the radio frame with SFN=0 includes SI-1, SI-2, SI-3, SI-4, SI-5, SI-6, and the transmission sequence is SI-1, SI-4, SI-5, SI-6, SI-3, SI-2; the SI transmitted in the radio frame with SFN=8 includes SI-1; the SI transmitted in the radio frame with SFN=16 includes SI-1 and SI-2; the SI transmitted in the radio frame with SFN=24 includes SI-1; the sequence of the SI transmitted in the radio frame with SFN=32 is SI-1, SI-3, SI-2; the SI transmitted in the radio frame with SFN=40 includes SI-1; the SI transmitted in the radio frame with SFN=48 includes SI-1 and SI-2; the SI transmitted in the radio frame with SFN=56 includes SI-1.

Based on the above description, referring to FIG. 5, when SFN=0, SIs are transmitted according to the sequence of SI-1, SI-4, SI-5, SI-6, SI-2, SI-3. According to the rule of the present invention, SI-2 is transmitted at the place where SFN=16. However, on the other hand, according to the scheduling rule, it should start to transmit SI-1 and SI-2 at SFN=16, i.e., the SI-2 of the SI started to be transmitted from the radio frame with SFN=16 is also transmitted at SFN=16, in other words, an overlap between SI-2 and SI-2 occurs, in such a case, in the overlapped transmission window, SI-2 is broadcasted only once, in fact, the first broadcasted SI-2 (i.e., the delayed broadcast) is cancelled.

EXAMPLE 4

Figure 6:
FIG. 6 is a schematic view of Example 4 of the method for transmitting system information according to Embodiment 1 of the present invention.
Figure 6:
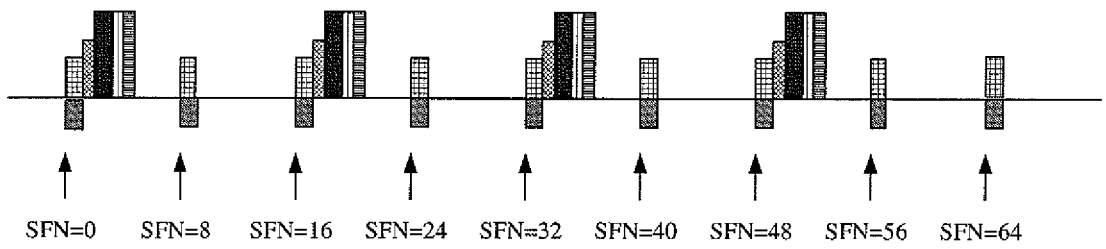

In this example, a discrete re-transmitting method is employed. The transmission window of each time is 10 ms, the sequence of scheduling information configured in the SI is SI-1, SI-2, SI-3, SI-4, SI-5, SI-6. Wherein, SI-1 is re-transmitted once, SI-2 and SI-3 are re-transmitted twice, SI-4, SI-5 and SI-6 are re-transmitted 6 times. For the discrete re-transmitting method, the starting time of the first transmission of all SIs should be determined at first, the starting time of other re-transmission is determined by adding a uniform interval. For example, in FIG. 6, the starting time of the first transmission of SI-2 is SFN %16=0, and SI-2 is re-transmitted twice, then the starting time of the next re-transmission is SFN %16=8. Refer to FIG. 5 for the particular scheduling content of the scheduling.

Particularly, the scheduling rule of each re-transmission of the SIs in the Example is shown in the following table:

| | $1^{st}$ transmission | $2^{nd}$ transmission | $3^{rd}$ transmission | $4^{th}$ transmission |
|---|---|---|---|---|
| SI-1 | SFN %8 = 0 | N/A | N/A | N/A |
| SI-2 | SFN %16 = 0 | SFN %16 = 8 | N/A | N/A |
| SI-3 | SFN %32 = 1 | SFN %32 = 17 | N/A | N/A |
| SI-4 | SFN %64 = 2 | SFN %64 = 18 | SFN %64 = 34 | SFN %64 = 50 |
| SI-5 | SFN %64 = 3 | SFN %64 = 19 | SFN %64 = 35 | SFN %64 = 51 |
| SI-6 | SFN %64 = 4 | SFN %64 = 20 | SFN %64 = 36 | SFN %64 = 52 |

From above described embodiments, it can be seen that in the method embodiment of the present invention, the influence on the other SIs caused by the re-transmission of the SI-1 can be reduced by allowing the transmission window of the SI-1 to overlap with the transmission window of the other SIs; by specifying the transmission sequence of the SIs, a terminal is enabled to determine the starting time and ending time of the transmission of the SI so as to make a corresponding selection in the case that an overlap of the SI transmission occurs.

Method Embodiment 2

Figure 7:
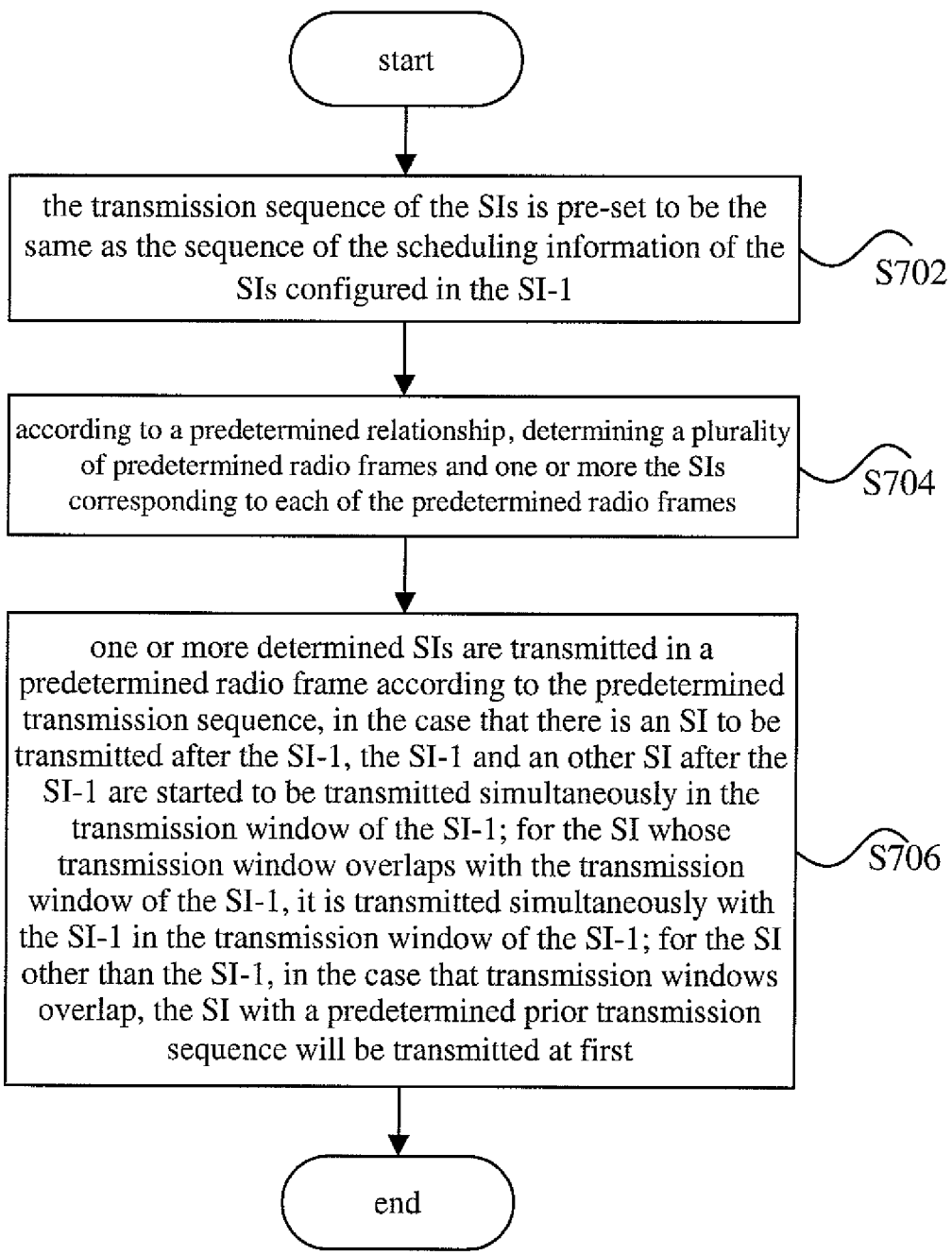
FIG. 7 is a flow chart of the method for transmitting system information according to Embodiment 2 of the present invention.

According to the embodiment of the present invention, another method for transmitting SI is further provided. FIG. 7 is a flow chart of the method for transmitting SI according to Embodiment 2 of the present invention; As shown in FIG. 7, the method comprises the following processes (Step S702-Step S706):

Step S702, the transmission sequence of the SIs is pre-set to be the same as the sequence of the scheduling information of the SIs configured in the SI-1;

Step S704, according to a predetermined relationship, determining a plurality of predetermined radio frames and one or more the SIs corresponding to each of the predetermined radio frames, wherein the predetermined relationship is that the result of the system frame number of the predetermined radio frame MOD the scheduling period of one or more SIs corresponding thereto is 0;

Step S706, one or more determined SIs are transmitted in a predetermined radio frame according to the predetermined transmission sequence, wherein in the case that there is an other SI to be transmitted after the SI-1, the SI-1 and the other SI after the SI-1 are transmitted in the transmission window of the SI-1; for the SI whose transmission window overlaps with the transmission window of the SI-1, it is transmitted simultaneously with the SI-1 in the transmission window of the SI-1; for the SIs other than the SI-1, in the case that the transmission windows overlap, the SI with a prior transmission sequence will be transmitted at first. Wherein, the sub-frame for transmitting the other SIs in the transmission window of the SI-1 is different from the sub-frame for transmitting the SI-1 in the time domain.

Similar to above method Embodiment 1, for the case that the transmission window of the SI-1 overlaps with the transmission window of other SIs, the SI-1 and the other SIs are transmitted in the transmission window of the SI-1. Moreover, for the identical SIs with overlapped transmission windows, the identical SIs are transmitted only once in the transmission window.

The present method embodiment will be described by taking the example of FIG. 4 as an example.

The configured transmission sequence in the scheduling information of SI is SI-2, SI-3, SI-4, SI-5, SI-6, i.e., the transmission sequence of the SIs is SI-1, SI-2, SI-3, SI-4, SI-5, SI-6 (corresponding to Step S702).

Thereafter, in 640 ms, for the radio frame with SFN=0, SFN %8=0, SFN %16=0, SFN %32=0, SFN %64=0, and thus the SIs transmitted in the radio frame with SFN=0 include SI-1, SI-2, SI-3, SI-4, SI-5, SI-6, and the transmission sequence is SI-1, SI-2, SI-3, SI-4, SI-5, SI-6.

According to the above method, it can also be determined that, for the radio frame with SFN=8, SFN %8=0, and thus the SI started to be transmitted from the radio frame with SFN=8 includes SI-1; for the radio frame with SFN=16, SFN %8=0, SFN %16=0, and thus the SIs started to be transmitted from the radio frame with SFN=16 include SI-1 and SI-2. As such, for the physical frame with SFN=24, SFN %8=0, and thus the SI transmitted in the radio frame with SFN=24 includes SI-1; for the physical frame with SFN=32, SFN %8=0, SFN %16=0, SFN %32=0, and thus the SIs transmitted in the radio frame with SFN=32 include SI-1, SI-2, SI-3; for the physical frame with SFN=40, SFN %8=0, and thus the SI transmitted in the radio frame with SFN=40 includes SI-1; for the radio frame with SFN=48, SFN %8=0, SFN %16=0, and thus the SIs transmitted in the radio frame with SFN=48 include SI-1 and SI-2; for the radio frame with SFN=56, SFN %8=0, and thus the SI transmitted in the radio frame with SFN=56 includes SI-1. (The above process corresponds to Step S704.)

As shown in FIG. 4, at the place where SFN=0, the transmission sequence of SIs is SI-1, SI-2, SI-3, SI-4, SI-5, SI-6, wherein SI-1 and SI-2 have the same starting point.

At the place where SFN=8, the transmission windows of SI-4 and SI-1 overlap, and thus, according to the technical scheme of the embodiment of present invention as shown in FIG. 4, SI-4 and SI-1 are both transmitted in the transmission window of SI-1.

At the place where SFN=16, the transmission sequence of SIs is SI-1, SI-2, and SI-1 and SI-2 are transmitted simultaneously. It would start to broadcast SI-6 at SFN=16, however since the scheduling rule of SI-1 determines that it also start to broadcast SI-2 at SFN=16, the broadcast of SI-6 is delayed to be after SI-2 according to the present invention.

At other places where SFN %8=0, the SIs are broadcasted one-by-one sequentially according to the method of the present invention, for instance, at the place where SFN=32, the sequence for broadcasting SIs is SI-1, SI-2, SI-3, wherein SI-1 and SI-2 have the same starting point.

From the above description, it can be seen that by allowing the transmission window of the SI-1 to overlap with the transmission window(s) of other SI(s) and setting the transmission sequence of each SI, not only the influence on the other SI(s) caused by the re-transmission of the SI-1 can be reduced, but also the terminal is enabled to obtain the starting time and ending time of the transmission of each SI, and thus the terminal can selectively perform receiving according to its demand.

Other details of method Embodiment 2 can be understood by referring to method Embodiment 1, the similar or same content is omitted herein.

Method Embodiment 3

Figure 8:
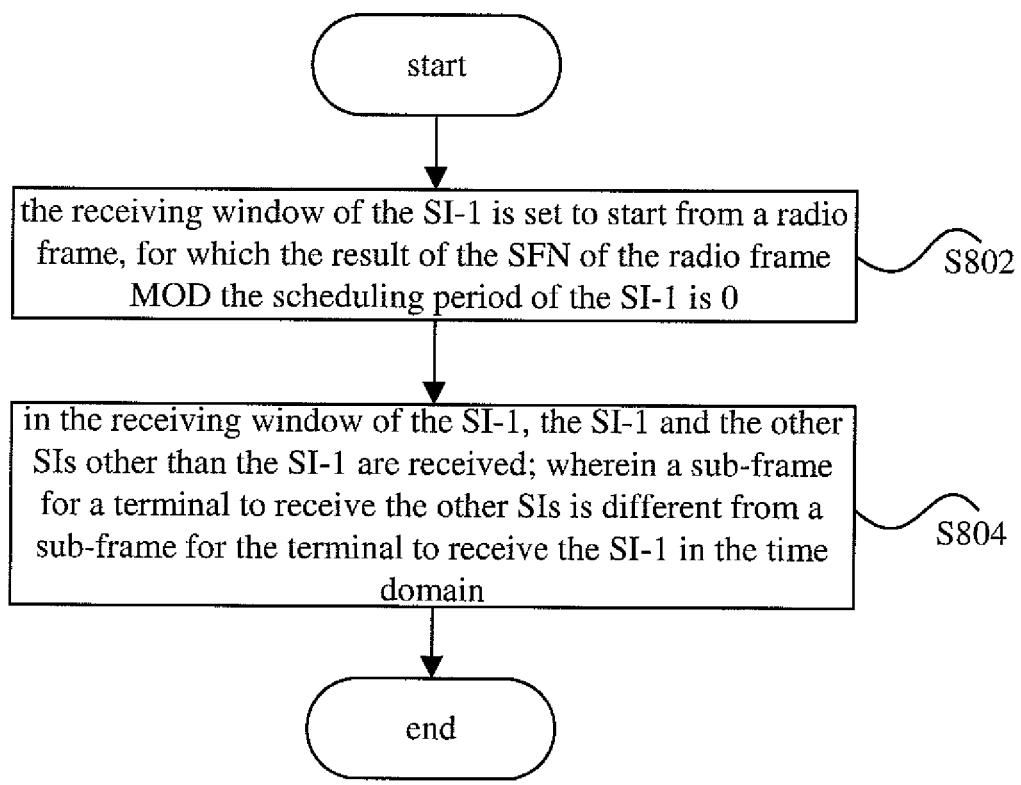
FIG. 8 is a flow chart of the method for receiving system information of an embodiment of the present invention.

According to the embodiment of the present invention, it is also provided a method for receiving SI, used for a terminal to receive an SI transmitted on the downlink by a base station. FIG. 8 shows a flow chart of the method for receiving SI. As shown in FIG. 8, the process of the method comprises (Step S802-Step S804):

Step S802, the receiving window of the SI-1 is set to start from a radio frame, for which the result of the SFN of the radio frame MOD the scheduling period of the SI-1 is 0;

Step S804, in the receiving window of the SI-1, the SI-1 and the other SIs other than the SI-1 are received; in the present embodiment, the sub-frame for the terminal to receive the other SIs is different from the sub-frame for the terminal to receive the SI-1 in the time domain.

Preferably, for the SIs other than the SI-1, further comprises: the receiving sequence of the SIs is pre-set to be the same as the sequence of the scheduling information of the SI configured in the SI-1; according to a predetermined relationship, determining a plurality of predetermined radio frames and one or more the SIs corresponding to each of the predetermined radio frames, wherein the predetermined relationship is that the result of the system frame number of the predetermined radio frame MOD the scheduling period of one or more SIs corresponding thereto is 0; according to the predetermined receiving sequence, one or more determined SIs are received in the predetermined radio frame, and in the case that an overlap of the receiving windows occurs, the SI with a predetermined prior receiving sequence is received at first;

Preferably, in the case that the SI employs a continuous retransmission manner, further comprises: for the identical SIs with overlapped receiving windows, the identical SIs are received only once in the receiving window.

The method embodiment will be described by taking the example of FIG. 4 as an example.

If the scheduling period of the SI-1 is 80 ms, start to receive the SI-1 in the radio frames with SEN %8=0, in particular, in 640 ms, these radio frames are radio frames with SFN=0, SFN=8, SFN=16, SFN=32, SFN=40, SFN=48, SFN=56.

If the configured sequence of the scheduling information of SI is SI-2, SI-3, SI-4, SI-5, SI-6, then the receiving sequence of the SIs is SI-1, SI-2, SI-3, SI-4, SI-5, SI-6.

Thereafter, in 640 ms, for the radio frame with SFN=0, SFN %8=0, SFN %16=0, SFN %32=0, SFN %64=0, and thus the SIs received in the radio frame with SFN=0 include SI-1, SI-2, SI-3, SI-4, SI-5, SI-6, and the receiving sequence is SI-1, SI-2, SI-3, SI-4, SI-5, SI-6;

According to the above method, it can be similarly determined that for the radio frame with SFN=8, SEN %8=0, and thus the SI started to be received from the radio frame with SFN=8 includes SI-1; for the radio frame with SFN=16, SFN % 8=0 and SFN %16=0, and thus the SIs started to be received from the radio frame with SFN=16 include SI-1 and SI-2. As such, for the physical frame with SFN=24, SFN %8=0, and thus the SI received in the radio frame with SFN=24 includes SI-1; for the physical frame with SFN=32, SFN %8=0, SFN % 16=0, SFN %32=0, and thus the SIs received in the radio frame with SFN=32 include SI-1, SI-2, SI-3; for the physical frame with SFN=40, SFN %8=0, and thus the SI received in the radio frame with SFN=40 includes SI-1; for the physical frame with SFN=48, SFN %8=0, SFN % 16=0, and thus the SIs received in the radio frame with SFN=48 include SI-1, SI-2; for the radio frame with SFN=56, SFN %8=0, and thus the SI received in the radio frame with SFN=56 includes SI-1.

As shown in FIG. 4, at the place where SFN=0, the receiving sequence of the received SIs is SI-1, SI-2, SI-3, SI-4, SI-5, SI-6, and SI-1 and SI-2 have the same starting point.

At the place where SFN=8, the receiving windows of SI-4 and SI-1 overlap, and thus, according to the technical scheme of the embodiment of the present invention as shown in FIG. 4, SI-4 and SI-1 are both received in the receiving window of the SI-1.

At the place where SFN=16, the receiving sequence of the SIs is SI-1, SI-2, and SI-1 and SI-2 are received simultaneously. It would start to broadcast SI-6 at SFN=16, however, since the scheduling rule of the SI-1 determines that it starts to broadcast SI-2 is also at SFN=16, the broadcast of SI-6 is delayed to be after SI-2 according to the present invention.

At other places where SFN %8=0, the SIs are received one-by-one sequentially according to the method of the present invention, for instance, at the place where SFN=32, the sequence for receiving SIs is SI-1, SI-2, SI-3, wherein SI-1 and SI-2 have the same starting point.

From above technical schemes provided by the invention, it can be seen that influence on other SIs caused by the re-transmission of the SI-1 can be reduced by allowing the transmission window of the SI-1 to overlap with the transmission window(s) of the other SI(s) or by allowing the receiving window of the SI-1 to overlap with the receiving window(s) of the other SI(s); by setting the transmission sequence or receiving sequence of each SI, a terminal is enabled to determine the starting time and ending time for transmitting or receiving SI so as to selectively perform receiving according to its demand.

The above description is only the preferred embodiments of the present invention, but not for limiting the present invention. For those skilled in the art, various alterations and modifications can be made to the present invention. Any alterations, substitutions and modifications falling into the spirit and principle of the present invention shall be in the scope protected by the present invention.

What is claimed is:

1. A method for transmitting system information, SI, used for transmitting general SI by a base station, wherein the general SI comprises an SI-1 and an other SI, wherein the method comprises:
   setting a sub-frame for transmitting the other SI and a sub-frame for transmitting the SI-1 in different time domains, wherein a sequence of scheduling information of the other SI is configured in the SI-1;
   according to a predetermined relationship, determining a plurality of predetermined radio frames and one or more the other SIs corresponding to each of the predetermined radio frames, wherein the predetermined relationship is that the result of the system frame number of the predetermined radio frame MOD the scheduling period of the one or more the other Sis corresponding thereto is 0;
   according to the sequence of the scheduling information of the other SI configured in the SI-1, transmitting the SI-1 and the determined one or more the other SIs from the predetermined radio frames;
   wherein in the case that a transmission window of the SI-1 overlaps with a transmission window of the other SI, the SI-1 and the other SI are transmitted simultaneously in the transmission window of the SI-1;

wherein in the case that an overlap of transmission windows between more than one other SI and the SI-1 occurs, the other SI with a prior transmission sequence is transmitted at first.

2. The method according to claim 1, wherein in the case that the other SI employs a continuous retransmission manner, the other SIs, which are identical with each other, are transmitted only once in the transmission window.

3. The method according to claim 2, wherein an other SI, which is to be transmitted after an other SI transmitted with delay, is transmitted after the transmission of the other SI transmitted with delay.

4. A method for receiving system information, SI, used for a terminal to receive general SI transmitted on the downlink by a base station, wherein the general SI comprises an SI-1 and an other SI, wherein the method comprises:

a sub-frame used for receiving the other SI by the terminal is different from a sub-frame used for receiving the SI-1 by the terminal in the time domain, wherein a sequence of scheduling information of the other SI is configured in the SI-1;

according to a predetermined relationship, determining a plurality of predetermined radio frames and one or more the other SIs corresponding to each of the predetermined radio frames, wherein the predetermined relationship is that the result of the system frame number of the predetermined radio frame MOD the scheduling period of the one or more the other Sis corresponding thereto is 0;

according to the sequence of the scheduling information of the other SI configured in the SI-1, transmitting the SI-1 and the determined one or more the other SIs from the predetermined radio frames;

wherein in the case that a transmission window of the SI-1 overlaps with a transmission window of the other SI, the SI-1 and the other SI are transmitted simultaneously in the transmission window of the SI-1;

wherein in the case that an overlap of transmission windows between more than one other SI and the SI-1 occurs, the other SI with a prior transmission sequence is transmitted at first.

5. The method according to claim 4, in the case that the SI employs a continuous retransmission manner, further comprising:

the other SIs, which are identical with each other, are received only once in the receiving window.

* * * * *